US010826128B2

(12) United States Patent
Lupart et al.

(10) Patent No.: US 10,826,128 B2
(45) Date of Patent: Nov. 3, 2020

(54) GALVANIC ELEMENT HAVING SOLID-STATE CELL STACK

(71) Applicant: Bayerische Motoren Werke Aktiengesellschaft, Munich (DE)

(72) Inventors: Saskia Lupart, Munich (DE); Odysseas Paschos, Munich (DE); Peter Lamp, Landsberg am Lech (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 309 days.

(21) Appl. No.: 15/299,758

(22) Filed: Oct. 21, 2016

(65) Prior Publication Data
US 2017/0040644 A1    Feb. 9, 2017

Related U.S. Application Data

(63) Continuation of application No. PCT/EP2015/055793, filed on Mar. 19, 2015.

(30) Foreign Application Priority Data

Apr. 22, 2014   (DE) .................. 10 2014 207 531

(51) Int. Cl.
H01M 10/0585   (2010.01)
H01M 10/04   (2006.01)
(Continued)

(52) U.S. Cl.
CPC ... H01M 10/0585 (2013.01); H01M 10/0468 (2013.01); H01M 10/0481 (2013.01);
(Continued)

(58) Field of Classification Search
CPC ......... H01M 10/0465; H01M 10/0481; H01M 10/052; H01M 10/0525; H01M 10/0562;
(Continued)

(56) References Cited

U.S. PATENT DOCUMENTS 9,112,212 B1* 8/2015 Fasching ............... H01M 4/134
2004/0048159 A1* 3/2004 Sada ..................... H01M 6/187
429/231.4
(Continued)

FOREIGN PATENT DOCUMENTS

CN  1595709 A  3/2005
CN  102368562 A  3/2012
(Continued)

OTHER PUBLICATIONS

International Search Report (PCT/ISA/210) issued in PCT Application No. PCT/EP2015/055793 dated May 15, 2015 with English translation (Three (3) pages).
(Continued)

Primary Examiner — Victoria H Lynch
(74) Attorney, Agent, or Firm — Crowell & Moring LLP

(57) ABSTRACT

A galvanic element is provided having a solid-state cell stack containing a multiplicity of electrochemical solid-state cells stacked along a longitudinal axis in a housing. Each of the electrochemical solid-state cells has a stack including at least one anode layer, at least one cathode layer and at least one solid electrolyte layer arranged between the anode layer and the cathode layer. At least one of the electrochemical solid-state cells includes an elastically deformable compensation element, which at least partly compensates for a change in volume along the longitudinal axis of the stacked electrochemical solid-state cells. A method for producing such galvanic elements is also provided. Advantageous applications are found in vehicles and mobile devices including such galvanic elements.

22 Claims, 4 Drawing Sheets

(51) Int. Cl.
  *H01M 10/0565* (2010.01)
  *H01M 10/0562* (2010.01)
  *H01M 10/052* (2010.01)
  *H01M 10/0525* (2010.01)

(52) U.S. Cl.
  CPC ..... *H01M 10/052* (2013.01); *H01M 10/0525* (2013.01); *H01M 10/0562* (2013.01); *H01M 10/0565* (2013.01); *H01M 2220/20* (2013.01); *H01M 2220/30* (2013.01); *Y02E 60/122* (2013.01); *Y02P 70/54* (2015.11)

(58) Field of Classification Search
  CPC ......... H01M 10/0565; H01M 10/0585; H01M 2220/20; H01M 2220/30
  See application file for complete search history.

(56) References Cited

U.S. PATENT DOCUMENTS

| | | | |
|---|---|---|---|
| 2007/0015061 A1* | 1/2007 | Klaassen | H01M 4/13 429/322 |
| 2010/0129705 A1* | 5/2010 | Gutsch | H01M 2/0262 429/163 |
| 2011/0162198 A1* | 7/2011 | Kawamoto | H01M 4/0433 29/623.1 |
| 2012/0028128 A1 | 2/2012 | Seino et al. | |
| 2012/0058380 A1 | 3/2012 | Wang et al. | |
| 2012/0244394 A1* | 9/2012 | Hohenthanner | H01M 2/0245 429/50 |
| 2013/0130078 A1 | 5/2013 | Schaefer et al. | |
| 2015/0171478 A1* | 6/2015 | Suzuki | H01M 10/0562 29/623.1 |

FOREIGN PATENT DOCUMENTS

| | | | | |
|---|---|---|---|---|
| CN | 102522560 A | 6/2012 | | |
| CN | 102576917 A | 7/2012 | | |
| DE | 10 2009 035 460 A1 | 2/2011 | | |
| DE | 10 2009 048 249 A1 | 4/2011 | | |
| DE | 10 2009 053 506 A1 | 5/2011 | | |
| DE | 10 2011 015 830 A1 | 10/2012 | | |
| EP | 0 923 148 A1 | 6/1999 | | |
| EP | 0971433 A1 * | 1/2000 | ............. | H01M 4/04 |
| EP | 1 487 034 A2 | 12/2004 | | |
| WO | WO-2014024926 A1 * | 2/2014 | ........ | H01M 10/0562 |

OTHER PUBLICATIONS

German-language Written Opinion (PCT/ISA/237) issued in PCT Application No. PCT/EP2015/055793 dated May 15, 2015 (Eight (8) pages).

German-language Search Report issued in counterpart German Application No. 10 2014 207 531.9 dated Nov. 28, 2014 with partial English translation (Thirteen (13) pages).

English-language Office Action issued in counterpart Chinese Application No. 201580020646.9 dated Apr. 3, 2018 (Ten (10) pages).

\* cited by examiner

GALVANIC ELEMENT HAVING SOLID-STATE CELL STACK

CROSS REFERENCE TO RELATED APPLICATIONS

This application is a continuation of PCT International Application No. PCT/EP2015/055793, filed Mar. 19, 2015, which claims priority under 35 U.S.C. § 119 from German Patent Application No. 10 2014 207 531.9, filed Apr. 22, 2014, the entire disclosures of which are herein expressly incorporated by reference.

BACKGROUND AND SUMMARY OF THE INVENTION

The present invention relates to galvanic elements having stacks of solid-state cells which contain a solid electrolyte. The present invention further relates to a method for producing and using such galvanic elements.

Batteries with solid electrolytes, also called solid-state batteries, may offer various advantages over batteries with conventional liquid electrolytes. Solid-state batteries may for example have improved safety properties, given that, relative to liquid electrolytes, solid electrolytes are usually not flammable. Solid electrolytes may also prevent dendrite growth between the positive and negative electrodes of an electrochemical battery cell during the charge and discharge operation, which with conventional batteries having liquid electrolytes may lead to short circuiting with thermal overheating or even to a fire or explosion of the battery (thermal runaway). The increased physicochemical stability of solid electrolytes relative to liquid electrolytes, and the greater selectivity of the charge carriers, may lead, moreover, to improved cycling stability and calendar lifetime, and ensure reduced self-discharge.

Generally speaking, solid-state batteries have poorer energy density and current density than batteries with liquid electrolytes. In order to improve these properties, improved solid electrolytes with greater ion conductivity and improved contact bases (see U.S. Publication No. 2012/028128 A, EP 0923148 A1), and thin-layer systems with solid electrolytes (see U.S. Publication No. 2012/058380 A1), have already been described.

Nevertheless, the known solid-state batteries continue to have certain disadvantages. For example, the solid-state batteries available to date are unsuitable for applications which impose relatively stringent requirements on lifetime, energy density, and power on charge and/or discharge. Such requirements must be met, for example, for the automotive sector.

It is therefore an object of the present invention to provide a galvanic element having improved properties over some of the disadvantages identified above. The invention is also based on the object of providing a method of producing such galvanic elements, and advantageous uses of such galvanic elements.

In one aspect of the invention, a galvanic element is provided which has a solid-state cell stack having a multiplicity of electrochemical solid-state cells stacked along a longitudinal axis in a housing. Each of these electrochemical solid-state cells along the longitudinal axis includes a stack having at least one anode layer, one cathode layer, and one solid electrolyte layer arranged between the anode layer and the cathode layer. At least one of the electrochemical solid-state cells includes an elastically deformable compensation element which at least partly compensates a change in volume along the longitudinal axis of the stacked electrochemical solid-state cells.

As used herein, the term "multiplicity" refers to more than ten, preferably more than 50, more preferably more than 100 solid-state cells. Overall, the solid-state cell stack includes not more than 10,000, preferably not more than 1000 solid-state cells.

As used herein, the term "longitudinal axis" refers to the stacking direction of the electrochemical solid-state cells. For example, the longitudinal axis extends perpendicularly to the two-dimensional extent of the major surfaces of the stack layers.

In the stack of the electrochemical solids-state cells there is customarily, in addition, a cathode collector layer in electrically conducting arrangement to the cathode layer. The cathode collector layer is preferably arranged adjacent to the major surface of the cathode layer that faces away from the solid electrolyte layer and anode layer. Additionally there may also be an anode collector layer in the stack of the electrochemical solid-state cells, in electrically conducting arrangement to the anode layer. Correspondingly, the anode collector layer is preferably arranged adjacent to the major surface of the anode layer that faces away from the solid electrolyte layer and cathode layer.

It is, however, also possible for the anode layer to be embodied simultaneously as anode collector layer. In such cases there is no additional anode collector layer present in the stack. For this purpose, the anode layer may include a metal, such as lithium. The anode layer is preferably embodied with metallic lithium. As a result of the high specific capacity of metallic lithium, a particularly high useful energy is achieved, relative to the mass and/or the volume of the galvanic element of the invention.

The inventors of the present invention found out that one problem of conventional stacked arrangements of solid-state cells is essentially that, during the charging and discharging of the cells, changes in volume occur within the solid-state cells or within the solid-state cell stack. These changes cannot be compensated by conventionally constructed solid-state cells, and lead consequently, during cycling, to a loss of contact between the layers of the stack and/or to cracks in the solid electrolyte. The result ultimately is a shortened lifetime as a result of battery failure.

The inventors further found out that the arrangement of a compensation element which is elastically deformable and substantially not inelastically deformed, in other words possessing, in particular, a high elasticity and a low plasticity, is highly suitable for compensating, or at least greatly reducing, such changes in volume in the solid-state cell stack. As a result, the risk of contact losses or of cracks in the solid electrolyte is reduced significantly. In this way, galvanic elements having improved calendar and cycling lifetime are provided, which at the same time, as a result of the stacked construction, fulfill the high energy density and power density required for use in automobiles.

The elastically deformable compensation element may be of layer like design. In particular, it is possible for the layer like compensation element to be designed as an additional layer of the stack, for example, as a further layer arranged before and/or after a stack sequence of cathode collector layer, cathode layer, solid electrolyte layer, anode layer, and, optionally, anode collector layer. The layer like design ensures particularly uniform volume compensation over the whole area of the solid-state cell stack.

According to one aspect of the invention, the elastically deformable compensation element is ion-conducting, more particularly lithium ion-conducting. In this way, the layer like compensation element in the stack may also be arranged between the cathode layer and the anode layer, without interrupting the migration of ions in the solid-state cell.

If the elastically deformable compensation element is ion-conducting, then it may also be designed as a solid electrolyte layer of the at least one electrochemical solid-state cell. In this way, the function of the compensation element is united with the advantages of a solid electrolyte layer in a particularly advantageous way, without any substantial influence on the other constructional features, in relation for example to size and/or weight, of the electrochemical solid-state cell.

Alternatively or additionally, the elastically deformable compensation element may also be arranged on at least one side surface of the stack along the longitudinal axis of the at least one electrochemical solid-state cell. As used herein, the term "side surface" refers to one of the four sides of the stack that connect the two opposite major surfaces of the stack to one another, with the layers of the stack extending parallel to the major surfaces. In this case the elastically deformable compensation element is preferably of blockwise configuration, with the shape of the block in its greatest extent extending substantially parallel to the longitudinal axis of the solid-state cell.

Blockwise compensation elements are typically arranged on at least two opposite side surfaces of the stack. According to one aspect of the invention, a blockwise compensation element has substantially the height of the stack of the electrochemical solid-state cell. According to another aspect of the invention, a blockwise compensation element may be arranged on at least one side surface of the stack between the anode collector layer and the cathode collector layer. It has been recognized that based on the aspects of the invention, the elastically deformable compensation element produces an advantageous spring effect which effectively compensates a change in volume along the longitudinal axis of the solid-state cell stack.

In another aspect of the invention, the elastically deformable compensation element has a modulus of elasticity which is lower than the modulus of elasticity of the other layers of the stack. The effect of this is that the changes in volume along the stack are compensated substantially exclusively by the elastic compensation element, while the other layers of the stack are protected from mechanical damage, due to deformation, for example, or from loss of contact.

For example, the elastically deformable compensation element may have a modulus of elasticity of at most 100 kN/mm$^2$, preferably, at most 30 kN/mm$^2$, and more preferably, at most 15 kN/mm$^2$. The figures for the modulus of elasticity are based on standard conditions, which are at a temperature of 20° C., a pressure of 1013 hPa, and with 50% relative humidity. It is also possible for the elastically deformable compensation element to have a modulus of elasticity of at most 1 kN/mm$^2$ or at most 0.3 kN/mm$^2$.

In another aspect of the invention, the elastically deformable compensation element of the at least one electrochemical solid-state cell includes an elastomer. Suitable elastomers include, for example, polyolefins, polystyrenes, polyacrylates, polyamides, polyesters, polyisoprenes, polyurethanes, silicones, and combinations of these substances. Especially suitable as conductive elastomers include polymers based on polyethylene oxide, based on polyacrylonitride or based on silicone. Thermosets, on the other hand, are very unsuitable materials for the compensation element.

In another aspect of the invention, the housing has an interior for accommodating the solid-state cell stack. The design of the interior is such that in the direction of the longitudinal axis, it deliberately has a smaller dimension than the solid-state cell stack outside the housing. In other words, the height of the interior intended for accommodation is smaller than the height of the solid-state cell stack at a point in time before its transfer into the housing. The effect of this, in accordance with the invention, is that the arrangement of the solid-state cell stack in the interior of the housing means that the elastically deformable compensation element of the at least one electrochemical solid-state cell is present in the housing in a state compressed along the longitudinal axis. Owing to the elastic deformability of the compensation element, however, this compressed state is reversible. In accordance with the invention, the elastically deformable compensation element is capable as a result, through renewed expansion out of the compressed state, of compensating a change in volume, such as a loss in volume, along the longitudinal axis of the solid-state cell stack within the housing.

In another aspect of the invention, the elastically deformable compensation element of the at least one electrochemical solid-state cell in the compressed state along the longitudinal axis has a layer thickness of 10 μm to 90 μm, preferably, 20 μm to 70 μm, and more preferably, 30 μm to 50 μm.

The layer thickness of the elastically deformable compensation element may be in the compressed state relative to a layer thickness of the elastically deformable compensation element in the noncompressed state, in other words outside the housing, along the longitudinal axis by at least 5%, preferably, by at least 15%, more preferably, by at least 20%. Overall, the compression of the layer thickness of the elastically deformable compensation element relative to the layer thickness in the noncompressed state may be up to 70%, up to 60%, or up to 50%. Furthermore, the layer thickness of the compressed state in relation to the layer thickness of the noncompressed state ought to be reversible to an extent of at least 70%, preferably, at least 80%, more preferably, at least 90%. The inventors recognized that within these parameters, a particularly reliable compensation of changes in volume during cycling of the galvanic element is achieved, and is manifested in particularly high reliability and lifetime of the galvanic cell.

In another aspect of the invention, the solid-state cell stack includes at least 30 electrochemical solid-state cells, of which, in the ratio, at least one of 30 of the electro-chemical solid-state cells includes the elastically deformable compensation element. It is also possible for the solid-state cell stack to include at least 20 electrochemical solid-state cells, of which in the ratio at least one of 20 of the electrochemical solid-state cells includes the elastically deformable compensation element. A further possibility is for the solid-state cell stack to include at least ten electrochemical solids-state cells, of which in the ratio at least one of ten, one of eight, one of five, or one of three of the electrochemical solid-state cells includes the elastically deformable compensation element. In certain configurations, provision is also made for every one or at least every second one of the electrochemical solid-state cells to include the elastically deformable compensation element.

It is possible for different electrochemical solid-state cells in the solid-state cell stack each to have differently shaped compensation elements, in relation for example to the arrangement of the compensation element or the material used, in order to achieve an advantageous combination of different properties.

According to another aspect of the invention, the electrochemical solid-state cells are configured as lithium ion cells.

In the galvanic element, the elastically deformable compensation element may at least partly compensate, in particular, a change in volume of the anode layer during a charge/discharge operation. In the case of a lithium ion cell, for example, during cycling, the transfer of lithium from the anode layer to the cathode layer leads to a loss in volume of the anode layer. Customarily, therefore, the anode layer is designed so that there is an excess of lithium in relation to the quantity of lithium cycled. For example, in the case of a 50% lithium excess in the anode layer, the layer thickness of the anode may be reduced by half during cycling.

Advantageously, therefore, the invention provides for the layer thickness and/or the compression of the elastic compensation layer to be designed such that it is capable of at least partly compensating the change in volume of the anode layer.

In another aspect of the invention, a method for producing the galvanic element of the invention is provided, which includes the following steps: A) providing a solid-state cell stack; and B) compressing the solid-state cell stack along the longitudinal axis and transferring the solid-state cell stack into a housing.

It is possible for method step B) to include a method step B1) of compressing the solid-state cell stack outside the housing, and a further method step B2) of transferring the solid-state cell stack in compressed form into the housing. Alternatively, it is possible for the solid-state cell stack in process step B) to be compressed at the same time while it is being transferred into the housing. In another aspect, provision is made for method step B) to include a method step B1') of transferring the solid-state cell stack into the housing and B2') of compressing the solid-state cell stack within the housing.

Another aspect of the invention relates to a vehicle having a galvanic element of the invention as described above. For example, the galvanic element of the invention may be used in a vehicle drive. Through the galvanic cell of the invention, it is possible for the first time to fulfill simultaneously the multiplicity of the requirements of automotive applications. These requirements include necessary power, long lifetime, and compliance with safety properties. In certain embodiments, therefore, the format of the galvanic element corresponds to the VDA in Standard for PHEV cells—for example, the PHEV1 format with height×width×depth of 85 mm×173 mm×21 mm—or for BEV cells—for example, the BEV1 format with height×width×depth of 115 mm×173 mm×32 mm—or to a multiple of the length, width and/or height of these formats, in order to ensure easy adaptation to existing vehicle architectures.

In yet another aspect of the invention, a mobile device including a galvanic element of the invention is provided. An advantageous use is found for example in the operation of cell phones, laptops or tablet PCs.

Below, the galvanic element and the method for producing the galvanic element of the present invention are explained in more detail, using schematic figures and exemplary embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
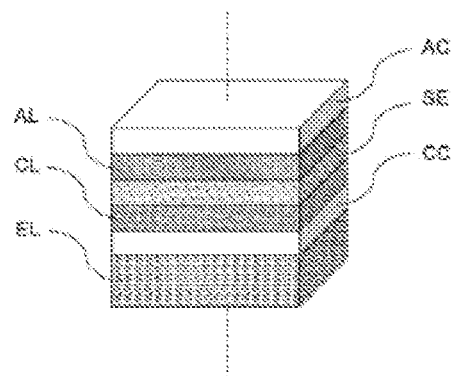
FIGS. 1A, 1B, and 1C each shows cross sections of an electrochemical solid-state cell having a layer like compensation element in accordance with one or more aspects of the invention.

FIG. 1 illustrates an electrochemical solid-state cell in accordance with one or more aspects of the invention. The electrochemical solid-state cell includes an elastically deformable compensation element. In FIG. 1A, the elastically deformable compensation element EL has a layer like configuration, as the bottommost layer of the stack of the electro-chemical solid-state cell. Arranged above it in the stacking direction along the longitudinal axis, indicated in the figures by the dot-dash line, are the cathode collector layer CC, the cathode layer CL, the solid electrolyte layer SE, the anode layer AL, and the anode collector layer AC.

The layers of the stack generally are preferably produced in thin-layer technology. The individual layers may be deposited, for example, by physical vapor deposition, wet-chemical methods, roll-to-roll processes, or screen-printing processes.

For this purpose, the layers may be applied to or deposited on a substrate which either remains in the stack sequence after manufacture (not shown in the figures) or at the end of the deposition process is removed from the stack sequence again. The substrate is preferably removed from the solid-state cell stack.

In this arrangement, suitable material for the compensation layer includes, in particular, polymers, silicones, or rubber.

The material of the cathode collector layer may include aluminum.

The cathode layer includes for example, a lithiating metal oxide, examples being layer oxides derived from the α-NaCrO$_2$ type, which may additionally contain elements of the transition metals. Non-limiting examples include lithium cobalt oxide, lithium manganese oxide, lithium nickel manganese cobalt oxide, and lithium nickel cobalt aluminum oxide, and also substitution variants thereof. Likewise other suitable include lithium metal phosphates, with Fe, Co, Mn or Ni, and lithium iron titanate. It is also possible for the cathode layer to consist of more than one cathode material. The material of the cathode layer preferably contains no vanadium.

The solid electrolyte layer may include a solid electrolyte which has an ion-conducting, more particularly lithium ion-conducting, glasslike or ceramic material. The solid electrolyte layer may for example include a solid electrolyte from the family of the garnets or perovskites. The solid electrolyte layer may also be a material derived from the structure of LISICON (Lithium (LI) Super (S) Ionic (I) Conductor (CON)), for example, thio-LISICON $Li_{4-x}M_{1-}$ $_yM'_yS_4$ where M=Si, Ge, P, and M'=P, Al, Zn, Ga, Sb, or NASISCON (Sodium (Na) Super (S) Ionic (I) Conductor (CON)) of the general formula $AMM'P_3O_{12}$ where $A=Li^+$, $Na^+$, $K^+$, $Rb^+$, $Cs^+$, $Mg^{2+}$, $Ca^{2+}$, $Sr^{2+}$, $Ba^{2+}$, $H^+$, $H_3O^+$, $NH_4^+$, $Cu^+$, $Ag^+$, $Pb^{2+}$, $Cd^{2+}$, $Mn^{2+}$, $Co^{2+}$, $Mn^{2+}$, $Co^{2+}$, $Ni^{2+}$, $Zn^{2+}$, $Al^{3+}$, $Ln^{3+}$, $Ge^{4+}$, $Zr^{4+}$, $Hf^{4+}$ or unoccupied, M and M'=di-, tri-, tetra- or pentavalent transition metal ions selected from the group of $Zn^{2+}$, $Cd^{2+}$, $Ni^{2+}$, $Mn^{2+}$, $CO^{2+}$, $Fe^{3+}$, $Sc^{3+}$, $Ti^{3+}$, $V^{3+}$, $Al^{3+}$, $Ga^{3+}$, $Y^{3+}$, $Lu^{3+}$, $Ti^{4+}$, $Zr^{4+}$, $Sn^{4+}$, $Si^{4+}$, $Ge^{4+}$, $V^{5+}$, $Nb^{5+}$, $Ta^{5+}$, $Sb^{5+}$, $As^{5+}$, it also being possible for phosphorus to be partially substituted by Si or As.

The solid electrolyte layer may for example also be a polymer electrolyte. Suitable examples include polymer electrolytes based on polyethylene oxide, based on polyacrylonitride, and based on silicone. The polymer electrolytes may further include a lithium ion-conducting salt such as lithium hexafluorophosphate, and/or an inorganic filler such as $Al_2O_3$ or $SiO_2$.

The solid electrolyte preferably has a conductivity of greater than or equal to $10^{-5}$ S/cm at room temperature.

It is also possible for the solid electrolyte layer to include a hybrid electrolyte, which has both a polymer electrolyte and a ceramic solid electrolyte.

The anode layer may include a material which is capable of reversible intercalation and deintercalation of lithium ions. Suitable materials are, for example, those comprising graphite and silicon, and also graphite/silicon mixtures. One particularly preferred material is metallic lithium. Metallic lithium is not used in conventional battery cells due to the risk of dendrite growth leading to short circuiting. The solid-state cell of the present invention prevents the growth of dendrites and in this way open access to the high specific capacity of metallic lithium as anode material.

The anode collector layer preferably includes copper.

The anode layer in the charged state typically has an excess of lithium of 15% to 70%, preferably 20% to 50%. This ensures that not all of the lithium of the anode layer is transported during the discharge operation to the cathode layer, but instead at least the excess fraction remains in the anode layer. As a result, on a further charging operation, deposition of lithium in the anode layer is improved, thereby increasing power and cycling life of the electrochemical solid-state cells. The transport of the lithium to the cathode reduces the layer thickness of the anode during cycling. For example, an anode layer with metallic lithium and a 50% lithium excess may be reduced during cycling by half of its layer thickness. With silicon as anode material, a 400% change in volume may occur during cycling. Silicon/graphite mixtures have similarly high intrinsic volume changes during cycling.

Figure 1B:
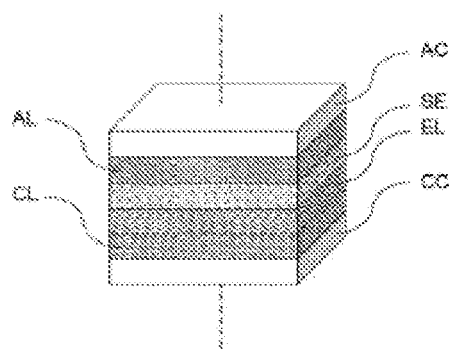

In FIG. 1B, the elastically deformable compensation element is arranged as a compensating layer between the anode layer and the solid electrolyte layer. In one aspect of the invention, for example, the compensating layer may be a lithium ion-conducting layer, and so, during charging and discharging of the galvanic element, lithium ions are transported between the anode layer and the cathode layer by the compensating layer.

Figure 1C:
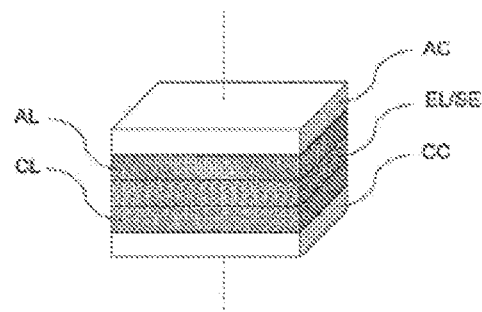

FIG. 1C shows a further aspect, in which the compensation element is designed as a solid electrolyte layer of the solid-state cell. In this aspect, the compensation element includes in particular one of the above-described polymer electrolytes and a lithium ion-conducting salt.

It is also possible for the solid-state cell stack to include different variants of solid-state cells with elastically deformable compensation element. For example, in one solid-state cell, the compensation element may be designed as a solid electrolyte layer as in FIG. 1C, while in another solid-state cell of the same solid-state cell stack, the compensation element is designed, as depicted in FIG. 1A, as a lower layer of the stack, and/or, in a further solid-state cell, the compensation element is configured as an ion-conducting layer, as depicted in FIG. 1B. A further possibility is for the compensation elements of different solid-state cells to include the same or else different materials.

Figure 2A:
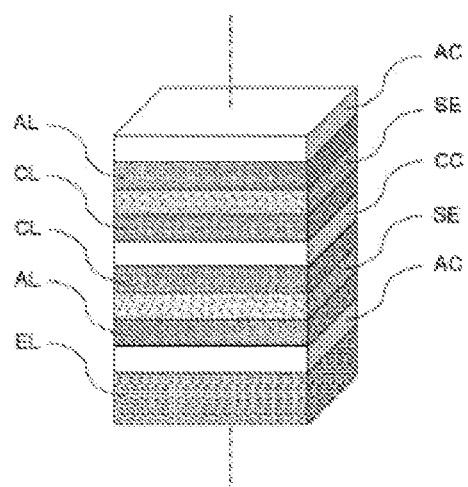
FIGS. 2A and 2B each shows cross sections of a solid-state cell stack with a layer like compensation element in accordance with one or more aspects of the invention.

FIG. 2A shows by way of example an intermediate stage in the method for producing the galvanic element in accordance with one or more aspects of the invention, with a stacked arrangement of a first electrochemical solid-state cell having the elastically deformable compensation element as described in FIG. 1A, over which a second solid-state cell without compensation element is arranged.

Figure 2B:
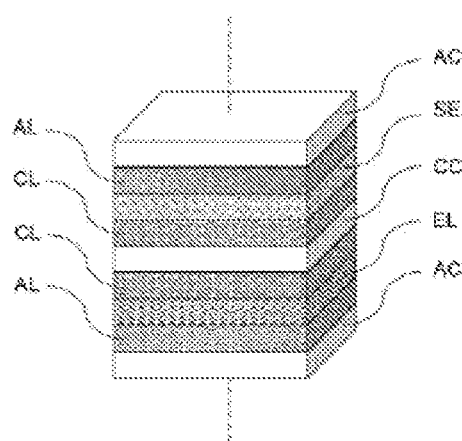

FIG. 2B shows by way of example an alternative intermediate stage in the method for producing the galvanic element in accordance with one or more aspects of the invention. In this example, there is a first solid-state cell with a compensation element which is configured as a solid electrolyte layer as described in FIG. 1C, over which a second solid-state cell without compensation element is arranged.

Figure 3A:
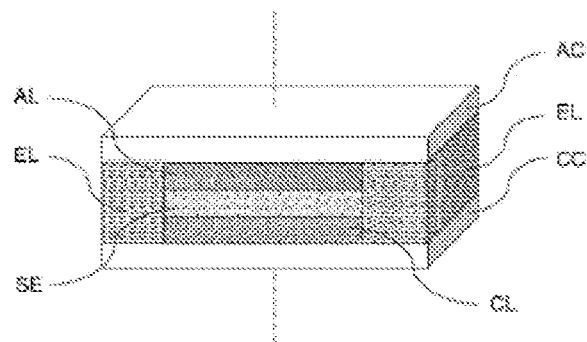
FIGS. 3A and 3B each shows cross sections of an electrochemical solid-state cell having a blockwise compensation element in accordance with one or more aspects of the invention.

FIG. 3A shows a cross section of a electrochemical solid-state cell in accordance with one or more aspects of the invention with elastically deformable compensation elements which are arranged substantially blockwise on two opposite side surfaces of the stack of an anode layer, a solid electrolyte layer, and a cathode layer. The stack with the laterally arranged compensation elements is covered, upwardly and downwardly in stack direction, by the anode collector layer and cathode collector layer, respectively. In this way, through elastic extension, the compensation element exerts a spring effect on the collector layers and the stack layers.

Figure 3B:
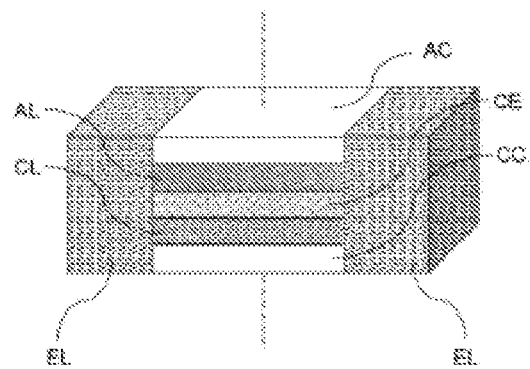

FIG. 3B shows a cross section of another solid-state cell in accordance with one or more aspects of the invention, in which two blockwise compensation elements are arranged on two opposite side surfaces of the stack with an anode collector layer, an anode layer, a solid electrolyte layer, a cathode layer, and a cathode collector layer.

Figure 4:
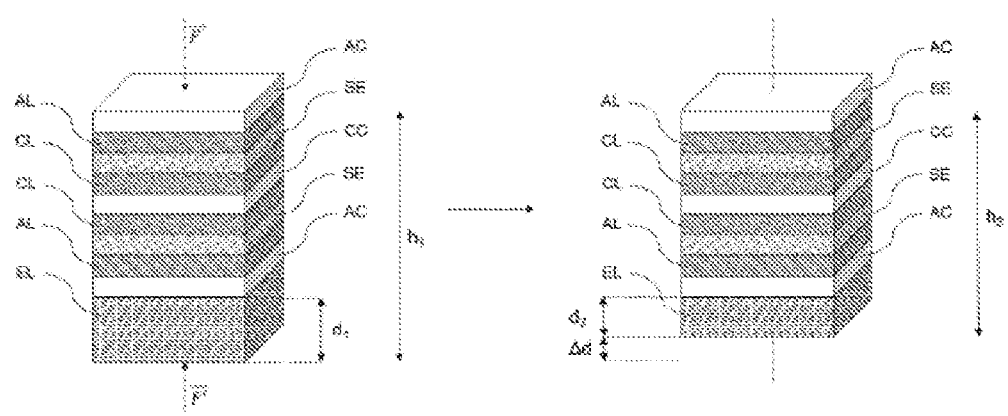
FIG. 4 shows cross sections of a solid-state cell stack with different intermediate stages in the production method of a galvanic element in accordance with one or more aspects of the invention.

With reference to a cross section through a solid-state cell stack as described in FIG. 3A, FIG. 4 shows, by way of example, further intermediate stages in the production method for a galvanic element in accordance with one or more aspects of the invention. The solid-state cell stack as provided has the exemplary height $h_1$. In the next step, a pressure is exerted on the solid-state cell stack, in the direction of the longitudinal axis. This is indicated schematically in FIG. 4 by the force vectors F and F', respectively. The exertion of the pressure may be achieved, for example, using springs or clips. In this way, the compensation element is compressed from a layer thickness $d_1$ to a layer thickness $d_2$, which is smaller by the amount $\Delta d$ from the layer thickness $d_1$. Correspondingly there is a reduction in the height of the solid-state cell stack to the height $h_2$.

As a result of transfer of the compressed solid-state cell stack into a housing having an interior which has a corresponding height $h_2$ for accommodating the solid-state cell stack, the solid-state cell stack within the housing is in compressed form.

Furthermore, compressing may also be carried out only in the housing. For example, by reducing the interior from a first height, suitable for accommodating the stack in the height $h_1$, following transfer of the stack into the interior, to the height $h_2$. For this purpose it is possible for the interior of the housing, for the accommodation of the solid-state cell stack, to be designed with apparatus for compressing the stack. Suitable apparatus for compressing the stack includes springs, clips and/or adjusting screws arranged in the interior of the housing, for adjusting the height of the interior intended for accommodating the solid-state cell stack. It is also possible for compressing to be realized by the introduction of insertion elements, examples being insertion elements with a wedge action, which are arranged between a side wall of the interior and the solid-state cell stack.

In these ways, the compressed compensation element, in the event of a loss of volume, is able to expand within the solid-state cell stack in the direction of the longitudinal axis and so to compensate the loss in volume in height of the amount Δd or of a partial amount thereof.

The housing is preferably a metallically solid housing, as for example what is called a hardcase. Particularly suitable are housing configurations with stainless steel or aluminum.

The galvanic element is not confined to one of the embodiments described or outlined by way of example. In particular, for reasons of clarity, the examples have been shown as individual solid-state cells or stacks with only two solid-state cells. Galvanic elements with further solid-state cells, in each case with or without further elastically deformable compensation elements, and also any combinations of the features described therein, represent embodiments which are likewise in accordance with the invention.

LIST OF REFERENCE SYMBOLS

AC Anode collector layer
AL Anode layer
SE Solid electrolyte layer
CL Cathode layer
CC Cathode collector layer
EL Compensation element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A galvanic element having a solid-state cell stack comprising a multiplicity of electrochemical solid-state cells stacked along a longitudinal axis in a housing,
   wherein each of the electrochemical solid-state cells along the longitudinal axis comprises a stack having at least one anode layer arranged adjacent to an anode collector layer, at least one cathode layer arranged adjacent to a cathode collector layer, and at least one solid electrolyte layer arranged between the anode layer and the cathode layer,
   wherein at least one of the electrochemical solid-state cells comprises an elastically deformable compensation element which at least partly compensates a change in volume along the longitudinal axis of the stacked electrochemical solid-state cells,
   wherein the elastically deformable compensation element has a modulus of elasticity of at most 100 kN/mm² and the elastically deformable compensation element is ion-conducting, and
   wherein the elastically deformable compensation element of at least one electrochemical solid-state cell along the longitudinal axis is in a compressed state relative to a noncompressed state of the solid-state cell stack if it were not within the housing, and wherein the elastically deformable compensation element of the at least one electrochemical solid-state cell in the compressed state along the longitudinal axis has a layer thickness of 10 μm to 90 μm.

2. The galvanic element according to claim 1, wherein the elastically deformable compensation element of the at least one electrochemical solid-state cell is of layer like design.

3. The galvanic element according to claim 1, wherein the elastically deformable compensation element is designed as an additional layer of the stack of the at least one electrochemical solid-state cell.

4. The galvanic element according to claim 1, wherein the elastically deformable compensation element is designed as solid electrolyte layer of the at least one electrochemical solid-state cell.

5. The galvanic element according to claim 1, wherein the elastically deformable compensation element is arranged on at least one side surface of the stack along the longitudinal axis of the at least one electrochemical solid-state cell, and wherein the side surface is one of the four sides of the stack that connect two opposite major surfaces of the stack to one another.

6. The galvanic element according to claim 1, wherein the elastically deformable compensation element has a modulus of elasticity which is smaller than the modulus of elasticity of the other layers of the stack.

7. The galvanic element according to claim 1, wherein the elastically deformable compensation element has a modulus of elasticity of at most 30 kN/mm².

8. The galvanic element according to claim 1, wherein the elastically deformable compensation element has a modulus of elasticity of at most 15 kN/mm².

9. The galvanic element according to claim 1, wherein the elastically deformable compensation element has a modulus of elasticity of at most 1 kN/mm².

10. The galvanic element according to claim 1, wherein the elastically deformable compensation element of the at least one electrochemical solid-state cell comprises an elastomer.

11. The galvanic element according to claim 1, wherein the housing, for accommodating the solid-state cell stack, is embodied with an interior which in the direction of the longitudinal axis has a smaller dimension than a corresponding dimension of the solid-state cell stack would have if it were not within the housing.

12. The galvanic element according to claim 1, wherein the elastically deformable compensation element of the at least one electrochemical solid-state cell in the compressed state along the longitudinal axis has a layer thickness of 20 μm to 70 μm.

13. The galvanic element according to claim 1, wherein the elastically deformable compensation element of the at least one electrochemical solid-state cell in the compressed state along the longitudinal axis has a layer thickness of 30 μm to 50 μm.

14. The galvanic element according to claim 1, wherein a layer thickness of the elastically deformable compensation element in the compressed state relative to a layer thickness of the elastically deformable compensation element in the noncompressed state along the longitudinal axis is compressed by at least 5%.

15. The galvanic element according to claim 1, wherein a layer thickness of the elastically deformable compensation element in the compressed state relative to a layer thickness of the elastically deformable compensation element in the noncompressed state along the longitudinal axis is compressed by at least 15%.

16. The galvanic element according to claim 1, wherein a layer thickness of the elastically deformable compensation element in the compressed state relative to a layer thickness of the elastically deformable compensation element in the noncompressed state along the longitudinal axis is compressed by at least 20%.

17. The galvanic element according to claim 1, wherein the solid-state cell stack comprises at least 30 electrochemical solid-state cells and comprises the elastically deformable compensation element in a ratio of at least one of 30 of the electrochemical solid-state cells.

18. The galvanic element according to claim 1, wherein the electrochemical solid-state cells are configured as lithium ion cells.

19. The galvanic element according to claim 1, wherein the elastically deformable compensation element is designed for at least partial compensation of a change in volume of the anode layer during a charge/discharge operation.

20. A method for producing the galvanic element of claim 1, comprising the following steps:
   providing the solid-state cell stack; and
   compressing the solid-state cell stack along the longitudinal axis and transferring the solid-state cell stack into the housing.

21. A vehicle having the galvanic element according to claim 1.

22. A mobile device having the galvanic element according to claim 1.

* * * * *